US006982293B2

(12) United States Patent
Shin et al.

(10) Patent No.: US 6,982,293 B2
(45) Date of Patent: *Jan. 3, 2006

(54) OLEFIN TYPE THERMOPLASTIC ELASTOMER

(75) Inventors: Gakuji Shin, Mie (JP); Tatsumi Tsuji, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 10/863,366

(22) Filed: Jun. 9, 2004

(65) Prior Publication Data

US 2004/0225067 A1 Nov. 11, 2004

Related U.S. Application Data

(63) Continuation of application No. 10/291,872, filed on Nov. 12, 2002, now Pat. No. 6,765,052.

(30) Foreign Application Priority Data

Nov. 13, 2001 (JP) .............................. 2001-347859

(51) Int. Cl.
*C08F 8/00* (2006.01)

(52) U.S. Cl. ...................... 524/191; 524/246; 524/240; 524/526; 524/515; 525/191

(58) Field of Classification Search ................ 524/515, 524/526, 191, 246, 240, 340; 525/191

See application file for complete search history.

(56) References Cited

U.S. PATENT DOCUMENTS

| 3,806,558 | A | 4/1974 | Fischer |
| 6,294,611 | B1 * | 9/2001 | Takayanagi et al. ........ 525/191 |
| 6,476,139 | B2 | 11/2002 | Akaike et al. |
| 2001/0011847 | A1 * | 8/2001 | Tominaga et al. ............ 524/62 |
| 2001/0018475 | A1 | 8/2001 | Tominaga et al. |

FOREIGN PATENT DOCUMENTS

| JP | 48-26838 | 4/1973 |
| JP | 01-103639 | 4/1989 |
| JP | 08-003332 | 1/1996 |
| JP | 10-120845 | 5/1998 |
| JP | 11-124440 | 5/1999 |
| JP | 11-269325 | 10/1999 |
| JP | 2002-047353 | 2/2002 |

* cited by examiner

*Primary Examiner*—William K. Cheung
(74) *Attorney, Agent, or Firm*—Oblon, Spivak, McClelland, Maier & Neustadt, P.C.

(57) ABSTRACT

An olefin type thermoplastic elastomer which satisfies the following formulae (I) to (III):

$$Y \leq -2X+350 \qquad (I)$$
$$X < 95 \qquad (II)$$
$$Z \leq 150 \qquad (III)$$

where X, Y and Z are as follows: X: JIS A hardness of a molded product as measured in accordance with JIS K6253 (no unit); Y: rate of change in the weight of a molded product measured based on JIS K6258 using IRM903 oil at 120° C. (unit: %); and Z: number of granular structures on an extruded sheet surface (250 mm×1,500 mm) (unit: granular structures).

32 Claims, 4 Drawing Sheets

{ Direct: × 4000 Final: × 8000 }

OLEFIN TYPE THERMOPLASTIC ELASTOMER

This application is a Continuation application of U.S. Ser. No. 10/291,872, filed on Nov. 12, 2002, U.S. Pat. No. 6,765,052.

BACKGROUND OF THE INVENTION

1. Field of the Invention

The present invention relates to an olefin type thermoplastic elastomer, and a sheet molded product and a laminate using this olefin type thermoplastic elastomer. Particularly, it relates to an olefin type thermoplastic elastomer, with which bleeding of a softening agent is less likely to take place, which is excellent in oil resistance, flexibility, mechanical strength, rubber elasticity and moldability, and an extruded product of which has a smooth surface, few granular structures and is excellent in outer appearance.

2. Discussion of Background

In recent years, from the viewpoint of rationalization of processes, recycling, etc., attention has been paid to thermoplastic elastomers such as styrene type, olefin type, ester type, amide type and urethane type materials which have moldability similar to that of thermoplastic resins, and which do not require a vulcanization step. These thermoplastic elastomers are widely used in components for automobiles, components for home electric appliances, components for medical instruments, electric wires, general merchandise, etc. Particularly, a partially crosslinked olefin type thermoplastic elastomer obtained by crosslinking an ethylene-α-olefin type copolymer rubber by heat treating a polypropylene type resin and an ethylene-α-olefin type copolymer rubber in the presence of an organic peroxide, has become well known.

However, conventional olefin type thermoplastic elastomers are poor with regard to flexibility, mechanical strength, rubber elasticity, etc., when compared with vulcanized rubber, and thus their use has been limited. In order to improve such properties, it has been attempted to impart flexibility by adding a mineral oil type softening agent or an organic peroxide non-crosslinked hydrocarbon rubber-like substance to the elastomer. Increasing the degree of crosslinking can improve rubber elasticity. However, even though crosslinking improves rubber elasticity, other changes such as a decrease in flexibility, decrease in mechanical strength or bleeding of the softening agent on the surface of the composition, may take place, and thus excellent physical properties are difficult to obtain.

In order to overcome such problems, a composition obtained by partially crosslinking an olefin type plastic and an oil-extended olefin type copolymer rubber obtained by adding a mineral oil type softening agent to a solution containing an olefin type copolymer rubber having a 100° C. Mooney viscosity of from 170 to 350, followed by removal of the solvent, has been proposed (Japanese Patent No. 2140072). However, the improvement in mechanical strength of this composition is inadequate. Further, when this composition is subjected to extrusion, the resulting molded product has a rough surface with a large number of small protrusions (called granular structures) which makes it difficult to obtain a molded product having a smooth surface.

In general, an olefin type thermoplastic elastomer is difficult to mold into a complicated shape by extrusion, particularly by contour extrusion, and a molded product with excellent smoothness of the surface is difficult to obtain. On the other hand, outer appearance and surface smoothness are very important for a molded product in the form of a thin sheet. Whether a material can be used for an application depends upon the purpose of use. In some cases the high gel content in the olefin type thermoplastic elastomer may lead to the formation of granular structures or may cause surface roughening in some cases and may render a material unsuitable for a given application.

Olefin type thermoplastic elastomers form a morphology (dispersion state) comprising a crystalline polypropylene resin as a matrix and olefin type rubber particles as domains in the matrix. The physical properties and characteristics of the olefin type thermoplastic elastomer are greatly related to the degree of dispersion of the olefin type rubber particles. It has been known that the physical properties of olefin type thermoplastic elastomers improve when the particles of the olefin type rubber are microscopically dispersed fine particles of from 1 to 2 $\mu$m. Extrudability of the olefin type thermoplastic elastomer and the surface characteristics of the extruded product are also greatly related to the morphology of the olefin type thermoplastic elastomer.

Conventionally, a physical means has been employed as a method of finely dispersing the olefin type rubber particles for improving morphology. For example, a means to improve dispersibility of the rubber by using a high-shear process with a machine such as a high-speed twin screw extruder may, for example, be employed. The fine dispersibility of the rubber particles can be increased by optimizing the screw constitution of a high-speed twin screw extruder to increase L/D of the extruder. Further, it has been attempted to improve dispersibility by making the elastomer pass through the extruder twice.

However, even by finely dispersing the rubber particles by such a physical means, it has conventionally been difficult to obtain an olefin type thermoplastic elastomer capable of forming an extruded product having few granular structures, having a smooth surface and excellent outer appearance with favorable extrudability.

The present invention overcomes the deficiencies of the prior art olefin type thermoplastic elastomers.

SUMMARY OF THE INVENTION

It is an object of the present invention to provide an olefin type thermoplastic elastomer wherein bleeding of a softening agent is less likely to take place, which has excellent oil resistance, flexibility, mechanical strength, rubber elasticity and extrudability, and which can provide extruded products having few granular structures, a smooth surface and excellent outer appearance. A sheet molded product and a laminate employing this olefin type thermoplastic elastomer are further objects of the invention.

The olefin type thermoplastic elastomer of the present invention satisfies the following formulae (I) to (III):

$$Y \leq -2X+350 \qquad (I)$$

$$X<95 \qquad (II)$$

$$Z \leq 150 \qquad (III)$$

where X, Y and Z are as follows:
  X: JIS A hardness of a molded product measured in accordance with JIS K6253 (no unit),
  Y: change in the weight of a molded product measured based on JIS K6258 using IRM903 oil at 120° C. (unit: %), Z: number of granular structures on an extruded sheet surface (250 mm×1,500 mm) (unit: granular structures).

An olefin type thermoplastic elastomer wherein bleeding of a softening agent is less likely to take place, which has excellent oil resistance, flexibility, mechanical strength, rubber elasticity and moldability, and which provides an extruded product having a smooth surface, few granular structures and an excellent outer appearance, can be obtained when X, Y and Z satisfy formulae (I) to (III).

In the present invention, among such olefin type thermoplastic elastomers, particularly preferred is one having a dispersion state (morphology) comprising an olefin type resin as a matrix and a crosslinked olefin type copolymer rubber having an average particle size of from 0.1 to 5 μm as domains (island dispersing elements) in the matrix. The olefin type resin is dispersed in an average particle size of from 0.01 to 0.5 μm in the domains.

The change in the weight (Y) in the above formula (I) is an index of the oil resistance, and is obtained based on JIS K6258 as follows.

A sample in a size of 50 mm×25 mm×2 mm is punched out from a sheet (120 mm×80 mm×2 mm) obtained by injection molding under an injection pressure of 50 MPa at a cylinder temperature of 220° C. at a mold temperature of 40° C., soaked in IRM903 oil and left to stand at 120° C. for 22 hours. After the soaking, the sample is taken out, the oil attached to the surface is wiped off, and the weight is measured to obtain the (%) change in the weight from the following formula:

$$\Delta W = (W2 - W1) \times 100 / W1$$

ΔW: change (%) in the weight

W1: mass of sample before soaking

W2: mass of sample after soaking

Further, the number of granular structures (Z) in the formula (III) is a value (number of granular structures) obtained by measuring the number of granular structures (protrusions) having a diameter of at least 0.3 mm on the surface (250 mm×1,500 mm) opposite to the surface which is in contact with a first roll, of a sheet having a width of from 250 to 300 mm and a thickness of from 0.2 to 0.4 mm extruded from a T-die of an extruder.

The sheet-form molded product of the present invention contains the olefin type thermoplastic elastomer of the present invention as a base composition.

The laminate of the present invention has a surface layer comprising the olefin type thermoplastic elastomer of the present invention as a base composition.

DETAILED DESCRIPTION OF THE PREFERRED EMBODIMENTS

The olefin type thermoplastic elastomer of the present invention satisfies formulae (I) to (III).

If formula (I) is not satisfied and Y>−2X+350, i.e. Y+2X>350, the balance between the oil resistance and hardness tends to be poor, and the elsatomer may not provide sufficient performance. Y+2X is preferably at most 330, particularly preferably at most 320, and preferably at least 200, particularly preferably at least 60.

Further, if formula (II) is not satisfied and JIS A hardness X is at least 95, the flexibility tends to be inadequate. X is preferably at most 94, particularly preferably at most 93, and preferably at least 10, particularly preferably at least 30.

Further, if the above formula (III) is not satisfied and the number Z of granular structures exceeds 150, the surface smoothness and outer appearance tend to be poor. Z is preferably at most 100, particularly preferably at most 50.

The constitution of the olefin type thermoplastic elastomer of the present invention is not particularly limited, but in general, an olefin type thermoplastic elastomer having a dispersion state (morphology) comprising an olefin type resin as a matrix and a crosslinked olefin type copolymer rubber as island domains, said domains having an average particle size of from 0.1 to 5 μm, wherein the olefin type resin is dispersed in an average particle size of from 0.01 to 0.5 μm in at least part of the domains, is preferred since the above formulae (I) to (III) are easily satisfied, and bleeding of a softening agent is less likely to take place, the elastomer tends to be excellent in oil resistance, flexibility, mechanical strength, rubber elasticity and extrudability, and an extruded product having few granular structures, a smooth surface and an excellent outer appearance can be obtained.

The above dispersion state has domains (islands, particles) of the rubber present in a matrix (sea) of the olefin type resin, and the olefin type resin constituting the matrix resin is further dispersed finely in the domains.

Such a dispersion state (morphology) is achievable when the dispersibility of the matrix resin and the rubber constituting the domains is good. The dispersion state is considered to contribute to a significant improvement in the physical properties (represented by the surface state) of the molded product.

By controlling blending, molding conditions, etc., so as to form the above morphology, the above formulae (I) to (III) are satisfied, and a favorable molded product (composition) can be obtained.

The average particle size of the domains of the olefin type copolymer rubber in the olefin type thermoplastic elastomer and the average particle size of the olefin type resin dispersed in the domains of the present invention, are values obtained by conducting real-space measurements with a transmission electron microscope on samples prepared in such a manner that a test specimen is frozen in an atmosphere of liquid nitrogen, and an ultrathin section is prepared by using an ultramicrotome, followed by RuO₄ staining. By staining with RuO₄, the olefin type copolymer rubber phase is selectively stained.

The average particle size of the domains of the olefin type copolymer rubber is an average value of all the rubber particles which are visible and which can be measured with a transmission electron microscope in a compartment of 13 μm×19 μm, with a magnification of 8,000, provided that the number of compartments is at least 5. In this case, a domain having a shape different from a circular shape is assumed to be an ellipse, and the average of the lengths of the major axis and the minor axis is taken as the particle size. The measurement is carried out with respect to the above electron micrography with a magnification of 8,000 by using a ruler with a minimum unit of 1 mm by manual procedure.

The average particle size of the olefin type resin dispersed in the domains is obtained in the same-way as mentioned above, as an average value of the olefin type resin particles in the domains of the olefin type copolymer rubber, in a compartment of 5.2 μm×7.7 μm, with a magnification of 20,000, provided that the number of compartments is at least 5. In this case, a particle having a shape different from a circular shape is assumed to be an ellipse, and the average of the lengths of the major axis and the minor axis is taken as the particle size.

When it is confirmed by the above observation method that the olefin type resin particles are dispersed, the improvements of the present invention are realized. Preferably, the olefin type resin is dispersed in at least 10% by area of the entire rubber domains, more preferably in at least 20% by area. If the olefin type resin is not dispersed, compatibility between the olefin type resin and the rubber tends to decrease, and the surface roughness of the extruded tends to increase.

The proportion by area of the domains in which the olefin type resin is dispersed, based on the entire rubber domains, is a proportion of the total area of the domains having the olefin type resin dispersed therein, based on the total area of the entire rubber domains in the sample when the particle size is calculated by the above measurement with a transmission electron microscope.

In the Examples and Comparative Examples as mentioned hereinafter, the average particle size and the proportion by area were measured and calculated by the above method.

In the present invention, the average particle size of the rubber domains, etc., may also be obtained by measurement with a scanning electron microscope or a scattering observation method such as light scattering.

The olefin type thermoplastic elastomer of the present invention having an olefin type resin as a matrix and an olefin type copolymer rubber having an average particle size of from 0.1 to 5 μm as domains, wherein the olefin type resin is dispersed as particles having an average particle size of from 0.01 to 0.5 μm in the domains, may be produced by the following blending process.

The material components and the production process suitable for production of the olefin type thermoplastic elastomer of the present invention will be explained below.

Olefin Type Copolymer Rubber (A: A1, A2)

The olefin type copolymer rubber (component (A)) is an amorphous random copolymer containing an olefin as the main component, such as an ethylene-propylene copolymer rubber, an ethylene-propylene-unconjugated copolymer rubber, an ethylene-butene-unconjugated copolymer rubber or a propylene-butadiene copolymer rubber. Among them, an ethylene-propylene-unconjugated diene copolymer rubber (EPDM) is suitable, and dicyclopentadiene, 1,4-hexadiene, cyclooctadiene, methylene norbornene or ethylidene norbornene may, for example, be used as the unconjugated diene, and an ethylene-propylene-ethylidene norbornene copolymer rubber is particularly suitable from such a viewpoint that an appropriate crosslinking structure can be obtained.

In the above EPDM, the ethylene content is usually from 50 to 90 wt %, preferably from 60 to 80 wt %, the propylene content is usually from 5 to 50 wt %, preferably from 10 to 45 wt %, and the unconjugated diene content is usually from 1 to 30 wt %, preferably from 3 to 20 wt %. If the ethylene content exceeds 90 wt %, flexibility of the composition tends to decrease, and if it is less than 50 wt %, mechanical properties tend to decrease. If the propylene content exceeds 50 wt %, mechanical properties tend to decrease, and if it is less than 5 wt %, flexibility and rubber elasticity tend to decrease. Further, if the unconjugated diene content is less than 1 wt %, the degree of crosslinking is less likely to increase and mechanical properties tend to decrease, and if it exceeds 30 wt %, injection moldability tends to decrease. Weight % is based on the total weight of the polymer.

In the present invention, a favorable molded product can be obtained by using an olefin type copolymer rubber component (A1) having a weight average molecular weight of at least 500,000, preferably at least 520,000, calculated as polypropylene by means of GPC for preparation of the component (A1B). If the weight average molecular weight of component (A1) is less than 500,000, improvement of mechanical strength tends to be inadequate. The upper limit of the weight average molecular weight of component (A1) is usually 1,000,000.

Further, an olefin type copolymer rubber component (A2) having a molecular weight of less than 500,000, may be added to component (A1) within a range where mechanical strength of the composition will be retained. The lower limit of the weight average molecular weight of the component (A2) is usually 50,000.

Mineral Oil Type Softening Agent (B)

The mineral oil type softening agent for rubber is used for softening the olefin type thermoplastic elastomer, increasing flexibility and elasticity, and may further improve processability and fluidity. In general, the mineral type softening agent is a mixture of an aromatic hydrocarbon, a naphthene type hydrocarbon and a paraffin type hydrocarbon.

A mineral oil having a proportion of carbon present as an aromatic hydrocarbon of at least 35 wt %, based on the total carbon amount, is called an aromatic type oil, one having a proportion of carbon present as a naphthene type hydrocarbon of from 30 to 45 wt % is called a naphthene type oil, and one having a proportion of carbon present as a paraffin type hydrocarbon of at least 50 wt % is called a paraffin type oil. Among them, a paraffin type oil is preferably used in the present invention.

As the paraffin type oil, one having a kinetic viscosity at 40° C. of from 20 to 800 cSt (centistokes), preferably from 50 to 600 cSt, having a degree of fluidity of from 0 to −40° C., preferably from 0 to −30° C., and a flash point (COC) of from 200 to 400° C., preferably from 250 to 350° C., is suitably used.

Olefin Type Resin (C)

As the olefin type resin, a propylene type resin, an ethylene type resin, a crystalline polybutene-1 resin, or an ethylene type resin such as an ethylene-vinyl acetate copolymer, an ethylene-(meth)acrylic acid copolymer or an ethylene-(meth)acrylate copolymer may be mentioned. Among these olefin type resins a propylene type resin is preferred. As the propylene type resin, a homopolymer of propylene and a copolymer resin containing propylene as the main component, preferably a propylene-α-olefin copolymer, specifically a propylene/ethylene random copolymer and a propylene/ethylene block copolymer may, for example, be mentioned.

These propylene type resins have a melt flow rate (JIS K7210, 230° C., 21.2 N load) of from 0.05 to 100 g/10 min, preferably from 0.1 to 50 g/10 min. If a resin having a melt flow rate less than 0.05 g/10 min. is used, moldability tends to be poor, and the outer appearance of the molded product may suffer. If a melt flow rate exceeding 100 g/10 min. is used, mechanical characteristics such as tensile rupture strength tend to decrease.

Organic Peroxide (D)

As the organic peroxide, either aromatic type or aliphatic type peroxides may be used. The peroxides may be a single peroxide or a mixture of at least two types of peroxides. A dialkyl peroxide such as di-t-butyl peroxide, t-butyl cumyl peroxide, dicumyl peroxide, 2,5-dimethyl-2,5-di(t-butylperoxy)hexane, 2,5-dimethyl-2,5-di(t-butylperoxy)hexyne-3, 1,3-bis(t-butylperoxyisopropyl)benzene or 1,1-di(t-butylperoxy)-3,3,5-trimethylcyclohexane, a peroxy ester such as t-butylperoxybenzoate, t-butylperoxyisopropyl carbonate or 2,5-dimethyl-2,5-di(benzoylperoxy)hexane or 2,5-dimethyl-2,5-di(benzoylperoxy)hexyne-3, or a diacyl peroxide such as acetyl peroxide, lauroyl peroxide, benzoyl peroxide, p-chlorobenzoyl peroxide or 2,4-dichlorobenzoyl peroxide, may, for example, be used. Among them, 2,5-dimethyl-2,5-di(t-butylperoxy)hexane and 1,3-bis(t-butylperoxyisopropyl)benzene are preferably used.

Crosslinking Aid

A crosslinking aid may be used in addition to the above components. The crosslinking aid may, for example, be an aid for peroxide such as sulfur, p-quinonedioxime, p-dinitrosobenzene or 1,3-diphenylguanidine, a polyfunctional vinyl compound such as divinylbenzene, triallylcyanurate, triallylisocyanurate or diallylphthalate, or a polyfunctional (meth)acrylate compound such as ethylene glycol di(meth) acrylate, diethylene glycol di(meth)acrylate, polyethylene glycol di(meth)acrylate, trimethylolpropane tri(meth)acrylate or allyl (meth)acrylate.

Other Components

Other optional components may be blended with the olefin type thermoplastic elastomer of the present invention in addition to the above components without impairing the effect of the present invention.

The optional component may, for example, be a filler, an antioxidant, a heat stabilizer, a light stabilizer, an ultraviolet absorber, a neutralizing agent, a lubricant, an anti-fogging agent, an anti-blocking agent, a slipping agent, a dispersant, a coloring agent, a flame retardant, an antistatic agent, a conductivity-imparting agent, a metal-inactivating agent, a molecular weight modifier, a bactericide, a fungicide or a fluorescent brightening agent, a second thermoplastic resin other than the above essential component, or an elastomer other than the above essential component. These components may be used alone or in combination.

The second thermoplastic resin may, for example, be an ethylene-α-olefin copolymer such as an ethylene-vinyl acetate copolymer, an ethylene-acrylic acid copolymer, an ethylene-methacrylic acid copolymer, an ethylene-acrylate copolymer or an ethylene methacrylate copolymer, a polyolefin resin such as polyethylene or a polybutene-1 resin, a polyphenylene ether type resin, a polyamide type resin such as nylon 6 or nylon 66, a polyester type resin such as polyethylene terephthalate or polybutylene terephthalate, a polyoxymethylene type resin such as a polyoxymethylene homopolymer or a polyoxymethylene copolymer, or a polymethyl methacrylate type resin.

The optional elastomer may, for example, be an ethylene type elastomer such as an ethylene-propylene copolymer rubber (EPM) an ethylene-propylene-unconjugated diene copolymer rubber (EPDM) other than the above essential component, an ethylene-butene copolymer rubber (EBM) or an ethylene-propylene-butene copolymer rubber, a styrene type elastomer such as a styrene-butadiene copolymer rubber or a styrene-isoprene copolymer rubber, or polybutadiene.

The filler may, for example, be glass fibers, hollow glass spheres, carbon fibers, talc, calcium carbonate, mica, potassium titanate fibers, silica, titanium dioxide or carbon black.

A preferred process for producing the olefin type thermoplastic elastomer of the present invention is explained below. This production process comprises a step of preparing the component (A1B) and a step of dynamic heat treatment of the components (A1B) and (C).

First, from 12 to 200 parts by weight, preferably from 40 to 150 parts by weight of the mineral oil type softening agent (component (B)) is mixed with 100 parts by weight of the olefin type copolymer rubber having a weight average molecular weight of at least 500,000 component (A1), to prepare an oil-extended olefin type copolymer rubber (component (A1B)).

If the amount of the component (B) is less than 12 parts by weight per 100 parts by weight of the component (A1), fluidity of the composition tends to decrease, and extrudability and injection moldability tend to deteriorate. On the other hand, if the amount of component (B) exceeds 200 parts by weight per 100 parts by weight of the component (A1), flexibility of the composition tends to significantly increase and processability tends to deteriorate, and at the same time the physical properties of the molded product tend to decrease.

In the present invention, by including component (B) within the above range, flexibility is secured, and fluidity also improves. Accordingly, an olefin type thermoplastic elastomer having improved processability and mechanical characteristics can be obtained. The inclusion of component (B) within the above range suppresses heat generation at the time of dynamic heat treatment, and as a result, when the elastomer is subjected to extrusion, a molded product having few granular structures and a smooth surface can be obtained.

Known methods may be employed to achieve oil extension by mixing component (B) with the compositions. For example, mechanically kneading components (A1) and (B) with an apparatus such as a roll or a Banbury mixer, adding a predetermined amount of component (B) to a solution of component (A1), followed by removal of the solvent by e.g. steam stripping, may be mentioned. The latter method of oil extension is particularly preferred, and as the solution of the component (A1), an olefin type copolymer rubber solution obtained by polymerization is preferably used since the operation is easily carried out.

Then, from 30 to 95 wt %, preferably from 40 to 90 wt %, of the resulting oil-extended olefin type copolymer rubber component (A1B) and from 5 to 70 wt %, preferably from 10 to 60 wt %, of the olefin type resin as the component (C) are mixed, provided that the total amount of components (A1B) and (C) is 100 wt %, followed by dynamic heat treatment in the presence of an organic peroxide as component (D) at a temperature lower than its one minute half life decomposition temperature.

If the content of component (C) is less than 5 wt % based on a total amount of 100 wt % of components (A1B) and (C), fluidity of the composition tends to decrease, thus leading to poor outer appearance of the molded product, and if it exceeds 70 wt %, flexibility of the composition to be obtained tends to be lost.

The amount of component (D) is usually from 0.05 to 3.0 parts by weight, preferably from 0.07 to 2.0 parts by weight, based on the total amount of 100 parts by weight of components (A1B) and (C). If the amount of component (D) is less than 0.05 part by weight, the effect of accelerating the crosslinking reaction tends to be small, and if it exceeds 3.0 parts by weight, the crosslinking reaction may be difficult to control.

Where the above crosslinking aid is used, its amount is usually from 0.01 to 4 parts by weight, preferably from 0.05 to 2 parts by weight, based on the total amount of 100 parts by weight of the components (A1B) and (C). If the amount of the crosslinking aid is less than 0.01 part by weight, the effect of its addition is minimal, and if it is used in an amount exceeding 4 parts by weight, no further improvement in the effect corresponding to the increase in the addition amount can be obtained, such being not advantageous in view of cost.

In the present invention, it is important to conduct the dynamic heat treatment (kneading treatment) at a temperature lower than the one minute half life decomposition temperature of component (D). Under dynamic heat treatment, the material is finely dispersed and undergoes crosslinking. Accordingly, the olefin type thermoplastic elastomer of the present invention may form a morphology comprising an olefin type resin as a matrix and a partially or completely crosslinked olefin type copolymer rubber as domains, wherein the domains have an average particle size of from 0.1 to 5 μm, and the olefin type resin is dispersed inside a part of the domains or the entire domains in an average particle size of from 0.01 to 0.5 μm. Accordingly, compatibility with the olefin type copolymer rubber and the olefin type resin tends to increase, and a composition with which a molded product having a few granular structures and having a smooth surface when extruded, can be produced.

The dynamic heat treatment temperature is measured as the temperature of the composition, and a preferred range is a temperature lower by at least 10° C. than the one minute half life decomposition temperature of the component (D) used. The lower limit of the dynamic heat treatment temperature is usually a temperature lower by 100° C. than the one minute half life decomposition temperature. The state of the material at the time of the dynamic heat treatment varies depending upon the type of the material and the dynamic heat treatment temperature and is not particularly limited although it is usually in a semi-molten state or a molten state.

The method for forming the morphology of dispersed particles in the matrix-domain-domain of the present invention is not limited to the above method. It is also possible to realize the morphology of dispersed particles in the matrix-domain-domain by another method, for example by maintaining the balance among the melting point of the olefin type resin as a material, the rate of crosslinking of the olefin type copolymer rubber, affinity of the olefin type resin for the olefin type copolymer rubber, etc.

As the mixing/kneading apparatus used for the dynamic heat treatment, a conventionally known closed Banbury mixer or a twin screw extruder may, for example, be mentioned. A twin screw extruder is particularly preferably used. For example, a twin screw extruder having a screw constitution sequentially having a dispersion zone and a crosslinking zone for the components (A1B) and (C) is used, while components (A1B), (C) and (D) are supplied from a hopper of the twin screw extruder. The temperature of the composition in the dispersion zone is adjusted to a temperature lower than the one minute half life decomposition temperature of component (D) to carry out dynamic heat treatment.

When component (A2) is used it is mixed together with components (A1B), (C) and (D). The amount of component (A2) is preferably at most double the total amount of the components (A1B) and (C) so that the mechanical strength will be maintained. Component (A2) maybe blended with component (A1B), or may be used together with component (A1) at the time of preparation of component (A1B). By use of component (A2) fluidity and injection moldability may be favorably affected in some cases.

In a case where component (B) is added after dynamic heat treatment (hereinafter component (B) added after the initial heat treatment will be referred to as "additional component (B)"), for example, an inlet is provided at a position downstream relative to the crosslinking zone of the twin screw extruder, and additional component (B) is supplied from a hopper separately provided on the inlet.

Additional component (B) may be further mixed in a proportion of at most 1.5 times the total amount of the components (A1B) and (C) after the dynamic heat treatment to impart the desired flexibility to the composition. If the amount of additional component (B) exceeds the above range, bleeding tends to be problematic.

Other additional components may be blended in any stage during production of the composition of the present invention. Blending may be during the processing of the composition or when the processed product is used.

The olefin type thermoplastic elastomer of the present invention is formed into a molded product (a molded product of itself or a laminate with another material) by utilizing conventional molding methods applied to thermoplastic elastomers (such as injection molding, extrusion, blow molding or compression molding) or following fabrication (formation of the laminate or heat forming). The resulting material may be used as a material for automobile components (such as weather stripping, material for ceiling, interior sheet, bumper mall, side mall, air spoiler, air duct hose and packing), components for civil engineering and building materials (such as waterproof material, joint filler and window frame packing for buildings), sports goods (such as grip for golf clubs and tennis rackets), industrial components (such as hose tube and gasket), components for home electric appliances (such as hose and packing), components for medical instruments, electric wires and general merchandise.

The thermoplastic elastomer of the present invention is particularly suitable for sheet-form molded products since it can be formed into a molded product having a smooth surface, few granular structures and a favorable outer appearance by extrusion. A conventional molding machine such as a calendar roll or an extruder equipped with a T-die or a cyclic die may be used. Further, embossing (graining) may be applied to the surface of the sheet-form molded product. A resin, rubber, foam, woven fabric, non-woven fabric, cotton cloth, paper, etc., may be laminated on the sheet-form molded product, and a coating layer may be coated on at least one surface of the sheet-form molded product. Further, such a sheet-form molded product or its laminate may be shaped by e.g. vacuum forming or pressure forming.

Now, the present invention will be described in detail with reference to Examples. However, it should be understood that the present invention is not intended to be limited by the Examples unless otherwise specified.

Materials and evaluation methods employed in the following Examples and Comparative Examples are as follows.

Materials (1) Oil-extended olefin type copolymer rubber (A1B-a)

An ethylene-propylene-ethylidene norbornene terpolymer rubber (ethylene content: 66 wt %, ethylidene norbornene content: 4.5 wt %, weight average molecular weight as calculated as polypropylene by means of GPC: 647,000), containing the component (B) as mentioned hereinafter in an amount of 100 parts by weight per 100 parts by weight of the copolymer rubber (2) Oil-extended olefin type copolymer rubber (A1B-b)

An ethylene-propylene-ethylidene norbornene terpolymer rubber (ethylene content: 66 wt %, ethylidene norbornene content: 4.5 wt %, weight average molecular weight as calculated as polypropylene by means of GPC: 487,000), containing the component (B) as mentioned hereinafter in an amount of 75 parts by weight per 100 parts by weight of the copolymer rubber (3) Olefin type copolymer rubber (A2)

An ethylene-propylene-ethylidene norbornene terpolymer rubber (an olefin type copolymer rubber having an ethylene content of 66 wt %, an ethylidene norbornene content of 4.5 wt % and a weight average molecular weight as calculated as polypropylene by means of GPC of 241,000)

(4) Mineral oil type softening agent for rubber (B)

A paraffin type oil (weight average molecular weight: 746, kinetic viscosity at 40° C.: 382 cSt, flow point: −15° C., flash point: 300° C., "PW380" manufactured by Idemitsu Kosan Co., Ltd.)

(5) Olefin type resin (C)

A propylene-ethylene random copolymer resin (ethylene content: 3.1 wt %, melt flow rate (230° C., 21.2N load): 0.7 g/10 min)

(6) Organic peroxide (D):

2,5-dimethyl-2,5-di(t-butylperoxy)hexane (POX) (one minute half life decomposition temperature: 179° C.)

(7) Crosslinking aid (a):

Divinylbenzene (DVB)

(8) Crosslinking aid (b):

Trimethylolpropane trimethacrylate (TMP)

Evaluation Methods

For the following measurements (1) to (3), (7) and (8), a sheet (120 mm×80 mm, thickness: 2 mm) obtained by injection molding by means of an in-line screw type injection molding machine ("IS 130" manufactured by Toshiba Machine Co., Ltd.) under an injection pressure of 50 MPa at a cylinder temperature of 220° C. at a mold temperature of 40° C. was used.

(1) JIS A hardness:

Measured in accordance with JIS K6253.

(2) Tensile rupture strength (MPa):

Measured based on JIS K6251 (JIS-3 dumbbell, tension speed: 500 mm/min).

(3) Permanent compression set (%)

Measured based on JIS K6262 (70° C., 22 hours, 25% compression).

(4) Surface roughness Ra ($\mu$m):

Based on JIS B0601, a sheet having a width of 250 mm and a thickness of 0.35 mm was extruded from a T-die of a 45 mm ϕ extruder (single flight type screw) manufactured by Watanabe Kakoki K.K., and the center line average roughness Ra on the surface of the obtained extruded product was measured by means of a surface roughness meter (SURF-COM 570A) manufactured by Toyo Seimitsusya K.K.

(5) Evaluation of granular structures on extruded sheet:

The number of granular structures having a diameter of at least 0.3 mm was measured on a sheet formed in the same manner as in the above (4) in a size with a width of 0.25 m and a length of 1.5 m, and each sample was evaluated in three grades in accordance with evaluation standards ○: excellent (number of granular structures is at most 150), Δ: good (number of granular structures exceeds 150 and is at most 500), and x: poor (number of granular structures exceeds 500).

(6) Extrudability:

The shape of a molded product extruded from a profile die at a screw revolution speed of 70 rpm at a temperature of 180° C., using a 40 mm ϕ monoaxial extruder (manufactured by Mitsubishi Heavy Industries, Ltd.) was evaluated. Whether the molded product reflected the shape of a pipe sleeve and the surface state were visually observed and evaluated in three grades ○: excellent, Δ: good, x: poor.

(7) Bleeding properties of mineral oil type softening agent for rubber (oil):

An injection-molded product was left to stand in an oven of 80° C. for 24 hours, and the oil bled on the surface of the molded product was visually observed, and evaluation was made in three grades ○: no bleeding observed, Δ: slight bleeding observed, and x: bleeding observed.

(8) Oil resistance (change in the weight):

An injection-molded product punched out into 50 mm×25 mm×2 mm was soaked in IRM903 oil and left to stand at 120° C. for 22 hours. After the soaking, the sample was taken out, the oil attached to the surface was wiped off, the weight was measured, and the change in the weight was obtained in accordance with the following formula:

$$\Delta W = (W2 - W1) \times 100 / W1$$

ΔW: change in the weight (%)

W1: mass of sample before soaking

W2: mass of sample after soaking (9) Average particle sizes of rubber domains and olefin type resin dispersed in the domains A molded product obtained in the same manner as in (4) was frozen in an atmosphere of liquid nitrogen, an ultrathin section was prepared by using an ultramicrotome, followed by $RuO_4$ staining, and then measurement with a transmission electron microscope was carried out. The average particle size of the rubber domains was obtained as an average value of all the rubber domains which were visible and which could be measured with a rule with a minimum unit of 1 mm, in a compartment of 13 $\mu$m×19 $\mu$m with a magnification of 8,000 at the measurement with a transmission electron microscope. The number of compartments for measurement was five. The average particle size of the olefin type resin dispersed in said domains was obtained as an average value, by measuring the particle sizes of the olefin type resin particles in the domains of the olefin type copolymer rubber in a compartment of 5.2 $\mu$m×7.7 $\mu$m with a magnification of 20,000 at the measurement with a transmission electron microscope, in the same manner as mentioned above by manual procedures. The number of compartments for measurement was five.

(10) Proportion of rubber domains having polyolefin dispersed therein based on the entire rubber domains:

Measurement with an electron microscope was carried out in the same manner as in (9) with a magnification of 8,000, and the proportion of the total area of the domains having an olefin type resin dispersed therein based on the total area of the entire rubber domains was calculated from rubber particles in a compartment of 13 $\mu$m×19 $\mu$m, provided that the number of compartments for measurement was five.

EXAMPLE 1

0.30 part by weight of POX and 0.40 part by weight of DVB were blended with 100 parts by weight of a mixture comprising 80 wt % of the component (A1B-a) and 20 wt % of the component (C), followed by blending with a Henschel mixer for one minute, and the mixture was put in a first supply port of a co-rotating twin screw extruder ("KTX44" manufactured by KOBE STEEL, LTD., L/D=41, number of cylinder blocks: 11) having a screw constitution with three kneading zones, at a rate of 30 kg/h, and granulation was carried out at a screw revolution speed of 350 rpm.

Further, a platinum resistance thermometer was installed at a position in contact with the composition in a cylinder at a position corresponding to a first kneading zone (dispersion zone), the cylinder temperature was set so that the temperature of the composition would be 130° C., and the cylinder temperatures were set so that the temperature of the composition in cylinders at positions corresponding to a second kneading zone (crosslinking zone) and a third kneading zone (dispersion zone in a case where the component (B) was present) would be 200° C., and kneading under melting was carried out for pelletizing.

Figure 1:
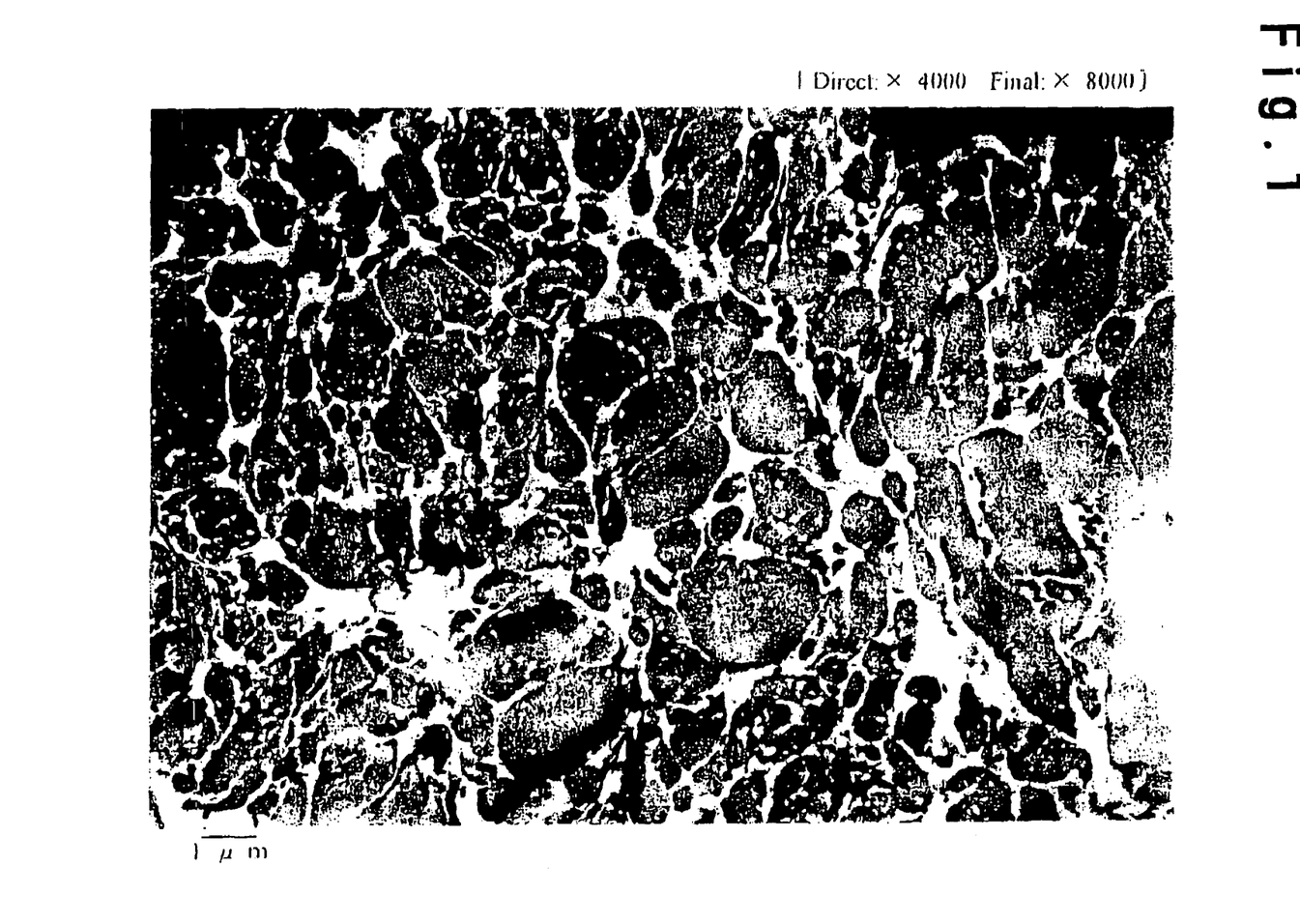
FIG. 1 is a transmission electron micrograph (magnification of 8,000) of a molded product obtained in Example 1.
Figure 2:
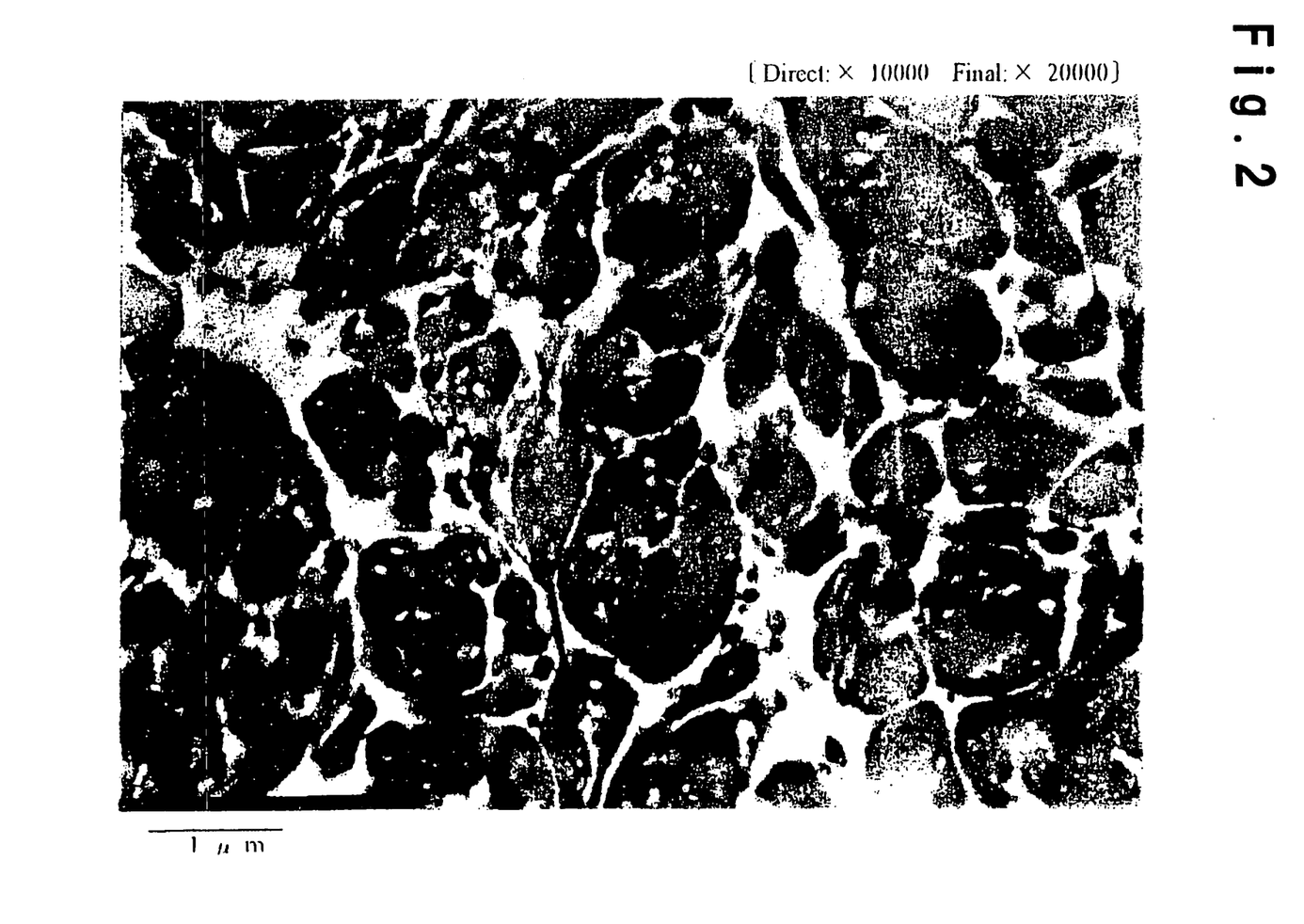
FIG. 2 is a transmission electron micrograph (magnification of 20,000) of a molded product obtained in Example 1.

In Example 1, a test specimen was cut out from a molded product obtained in the same manner as in (4) for evaluation of the morphology, and measurement with a transmission electron microscope was carried out by means of the above $RuO_4$ staining method. The obtained images are shown in FIG. 1 (magnification of 8000) and FIG. 2 (magnification of 20,000). In FIGS. 1 and 2, a white portion corresponds to a polyolefin phase and a black portion corresponds to a rubber phase, and it is observed that the polyolefin is incorporated in the rubber domains in the molded product of Example 1.

The average particle sizes of the rubber domains and the polyolefin particles in the domains were obtained by the above method, whereupon the average particle size of the rubber domains was 1.1 μm, and the average particle size of the polyolefin in the rubber domains was 0.2 μm. Further, the proportion of the rubber domains having the polyolefin dispersed therein was 68% by area based on the entire rubber domains. These evaluation results are shown in Table 1. In Table 1, the blank means that nothing was added, and "–" means that the evaluation was impossible.

EXAMPLE 2

The same operation as in Example 1 was carried out except that the proportions of the components (A1B-a) and (C) were 60 wt % and 40 wt %, respectively. The evaluation results are shown in Table 1.

EXAMPLE 3

The same operation as in Example 1 was carried out except that the proportions of the components (A1B-a) and (C) were 60 wt % and 40 wt %, respectively. The evaluation results are shown in Table 1.

EXAMPLE 4

The same operation as in Example 1 was carried out except that 0.8 part by weight of TMP was used instead of DVB. The evaluation results are shown in Table 1.

EXAMPLE 5

The same operation as in Example 1 was carried out except that the temperature of the composition in the cylinder at a position corresponding to the first kneading zone was 160° C. The evaluation results are shown in Table 1.

EXAMPLE 6

The same operation as in Example 1 was carried out except that the component (A2) was further added in an amount of 0.15 time the total weight of the components (A1B-a) and (C), and the component (B) was supplied in an amount of 0.2 time the total weight of the components (A1B-a) and (C) to a second supply port installed at the cylinder between the second kneading zone and the third kneading zone. The evaluation results are shown in Table 1.

EXAMPLE 7

The same operation as in Example 1 was carried out except that the proportions of the components (A1B-a) and (C) were 40 wt % and 60 wt %, respectively, the component (A2) was further added in an amount of 0.8 time the total weight of the components (A1B-a) and (C), and the component (B) was supplied in an amount of 0.2 time the total weight of the components (A1B-a) and (C) to a second supply port installed at the cylinder between the second kneading zone and the third kneading zone. The evaluation results are shown in Table 1.

EXAMPLE 8

The same operation as in Example 1 was carried out except that the proportions of the components (A1B-a) and (C) were 43 wt % and 57 wt %, respectively, the component (A2) was further added in an amount of 1.15 times the total weight of the components (A1B-a) and (C), and the component (B) was supplied in an amount of 0.7 time the total weight of the components (A1B-a) and (C) to a second supply port installed at the cylinder between the second kneading zone and the third kneading zone. The evaluation results are shown in Table 2.

EXAMPLE 9

The same operation as in Example 1 was carried out except that the proportions of the components (A1B-a) and (C) were 43 wt % and 57 wt %, respectively, and the component (A2) was added in an amount of 0.43 time the total weight of the components (A1B-a) and (C). The evaluation results are shown in Table 2.

COMPARATIVE EXAMPLE 1

The same operation as in Example 1 was carried out except that the component (A1B-b) was used instead of the component (A1B-a).

Figure 3:
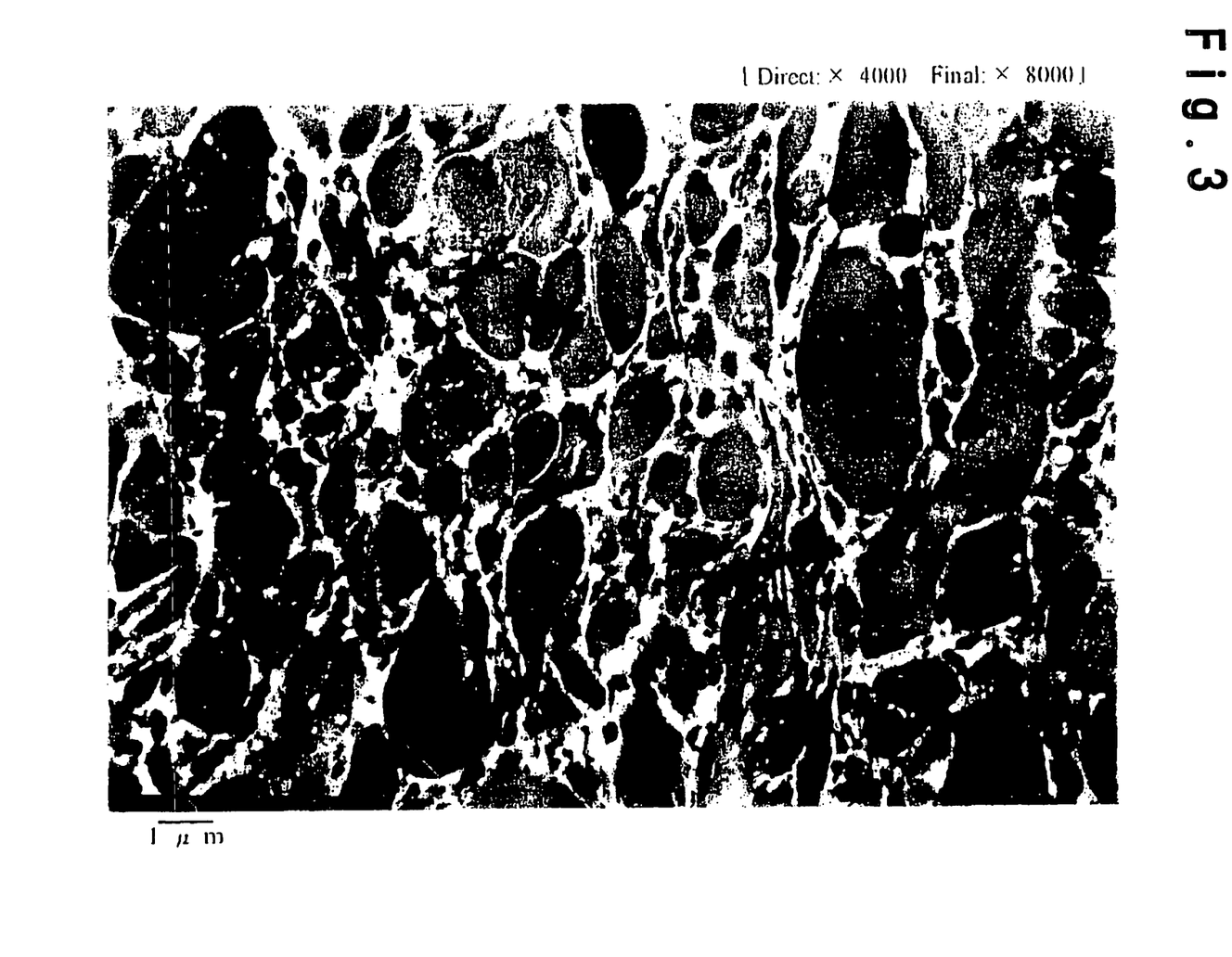
FIG. 3 is a transmission electron micrograph (magnification of 8,000) of a molded product obtained in Comparative Example 1.
Figure 4:
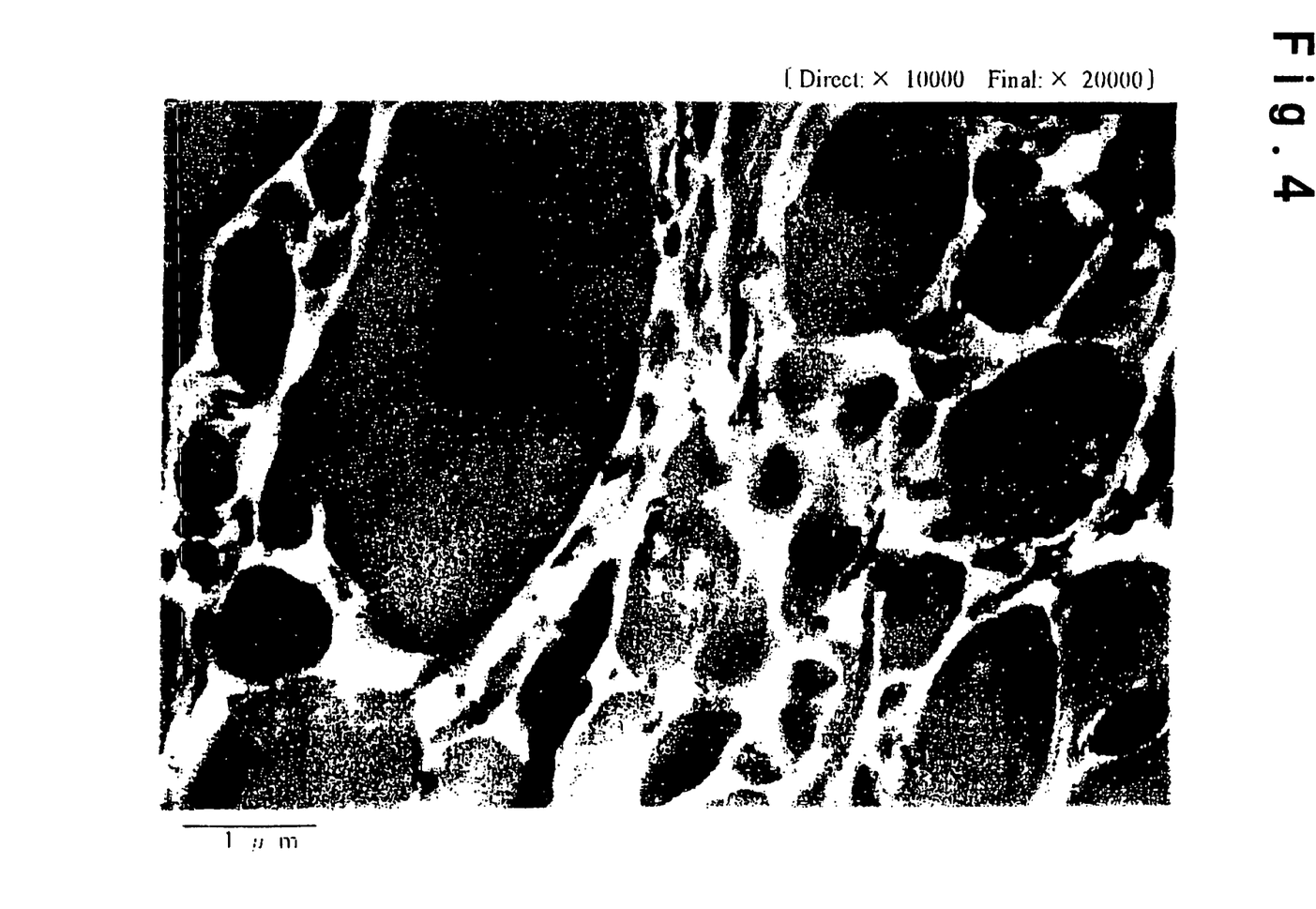
FIG. 4 is a transmission electron micrograph (magnification of 20,000) of a molded product obtained in Comparative Example 1.

Further, measurement with a transmission electron microscope was carried out by means of a $RuO_4$ staining method in the same manner as in Example 1, and the obtained images are shown in FIG. 3 (magnification of 8,000) and FIG. 4 (magnification of 20,000).

As evident from FIGS. 3 and 4, in the molded product of Comparative Example 1, no dispersion of the polypropylene in the rubber domains is confirmed.

The average particle size of the rubber domains was obtained in accordance with the above method, whereupon it was 2.0 μm. The evaluation results are shown in Table 2.

COMPARATIVE EXAMPLE 2

The same operation as in Example 1 was carried out except that the temperature of the composition in the cylinder at the position corresponding to the first kneading zone was 190° C. The evaluation results are shown in Table 2.

COMPARATIVE EXAMPLE 3

The same operation as in Example 1 was carried out except that the proportions of the components (A1B-a) and (C) were 20 wt % and 80 wt %, respectively. The evaluation results are shown in Table 2.

COMPARATIVE EXAMPLE 4

The same operation as in Example 1 was carried out except that the proportions of the components (A1B-a) and (C) were 97 wt % and 3 wt %, respectively. The evaluation results are shown in Table 2.

TABLE 1

| | | | | | Examples | | | | | |
|---|---|---|---|---|---|---|---|---|---|---|
| | | | | 1 | 2 | 3 | 4 | 5 | 6 | 7 |
| Composition | Component: A1B | -a (wt %) | | 80 | 90 | 60 | 80 | 80 | 80 | 40 |
| | | -b (wt %) | | | | | | | | |
| | Component: C (wt %) | | | 20 | 10 | 40 | 20 | 20 | 20 | 60 |
| | Component: A2 (amount) | | | | | | | | 0.15 | 0.8 |
| | Additional component: B (amount) | | | | | | | | 0.2 | 0.2 |
| | POX (part by weight) | | | 0.3 | 0.3 | 0.3 | 0.3 | 0.3 | 0.3 | 0.3 |
| | DVB (part by weight) | | | 0.4 | 0.4 | 0.4 | | 0.4 | 0.4 | 0.4 |
| | TMP (part by weight) | | | | | | 0.8 | | | |
| Composition temperature (° C.) | | | | 130 | 130 | 130 | 130 | 160 | 130 | 130 |
| Evaluation results | JIS A hardness (X) | | | 73 | 53 | 93 | 73 | 74 | 55 | 84 |
| | Tensile rupture strength (MPa) | | | 9.5 | 5.5 | 15 | 8.8 | 9.9 | 5.7 | 13 |
| | Permanent compression set (%) | | | 48 | 44 | 63 | 57 | 50 | 38 | 59 |
| | Surface roughness Ra (μm) | | | 1.0 | 1.8 | 1.0 | 0.8 | 1.2 | 1.6 | 1.5 |
| | Granular structures on extruded sheet | Number (granular structures)(Z) | | 17 | 24 | 7 | 12 | 25 | 22 | 35 |
| | | Judgment | | ○ | ○ | ○ | ○ | ○ | ○ | ○ |
| | Extrudability | | | ○ | ○ | ○ | ○ | ○ | ○ | ○ |
| | Oil bleeding property | | | ○ | ○ | ○ | ○ | ○ | ○ | ○ |
| | Oil resistance (rate of change in the weight) (Y: %) | | | 131 | 182 | 87 | 173 | 126 | 145 | 150 |
| | −2X + 350 | | | 204 | 244 | 164 | 204 | 202 | 240 | 182 |
| | Adjustability to formula (I) | | | ○ | ○ | ○ | ○ | ○ | ○ | ○ |
| | Adjustability to formula (II) | | | ○ | ○ | ○ | ○ | ○ | ○ | ○ |
| | Adjustability to formula (III) | | | ○ | ○ | ○ | ○ | ○ | ○ | ○ |
| Average particle size of rubber domains (μm) | | | | 1.1 | 2.0 | 1.0 | 1.0 | 1.5 | 1.4 | 1.6 |
| Average particle size of polyolefin in rubber domains (μm) | | | | 0.2 | 0.2 | 0.3 | 0.2 | 0.3 | 0.2 | 0.2 |
| Proportion of rubber domains having polyolefin dispersed therein based on the entire rubber domains (% by area) | | | | 68 | 58 | 82 | 48 | 59 | 62 | 48 |

The amounts of components in Table are as follows:
Total amount of components (A1B) and (C): 100 wt %
Amounts of component (A2) and additional component (B): amounts by weight based on the total weight of components (A1B) and (C)
POX, DVB, TMP: part by weight based on the total amount of 100 parts by weight of components (A1B) and (C)

TABLE 2

| | | | | Example | | Comparative Example | | | |
|---|---|---|---|---|---|---|---|---|---|
| | | | | 8 | 9 | 1 | 2 | 3 | 4 |
| Composition | Component: A1B | -a (wt %) | | 43 | 43 | | 80 | 20 | 97 |
| | | -b (wt %) | | | | 80 | | | |
| | Component: C (wt %) | | | 57 | 57 | 20 | 20 | 80 | 3 |
| | Component: A2 (amount) | | | 1.15 | 0.43 | | | | |
| | Additional component: B (amount) | | | 0.7 | | | | | |
| | POX (part by weight) | | | 0.3 | 0.3 | 0.3 | 0.3 | 0.3 | 0.3 |
| | DVB (part by weight) | | | 0.4 | 0.4 | 0.4 | 0.4 | 0.4 | 0.4 |
| | TMP (part by weight) | | | | | | | | |
| Composition temperature (° C.) | | | | 130 | 130 | 130 | 190 | 130 | 130 |
| Evaluation results | JIS A hardness (X) | | | 70 | 94 | 75 | 76 | 99 | * |
| | Tensile rupture strength (MPa) | | | 6.5 | 16 | 6.1 | 9.7 | 18 | — |
| | Permanent compression set (%) | | | 42 | 61 | 50 | 49 | 93 | — |

TABLE 2-continued

|  |  | Example | | Comparative Example | | | |
|---|---|---|---|---|---|---|---|
|  |  | 8 | 9 | 1 | 2 | 3 | 4 |
| Surface roughness Ra (μm) |  | 1.5 | 1.1 | 2.2 | 2.8 | 0.7 | — |
| Granular structures on extruded sheet | Number (granular structures)(Z) | 42 | 38 | 850 | 258 | 12 | — |
|  | Judgment | ○ | ○ | x | Δ | ○ | — |
| Extrudability |  | ○ | ○ | Δ | ○ | ○ | — |
| Oil bleeding property |  | ○ | ○ | ○ | ○ | ○ | — |
| Oil resistance (rate of change in the weight) (Y: %) |  | 178 | 124 | 226 | 124 | 53 | — |
| −2X + 350 |  | 210 | 162 | 200 | 198 | 152 | — |
| Adjustability to formula (I) |  | ○ | ○ | x | ○ | ○ | — |
| Adjustability to formula (II) |  | ○ | ○ | ○ | ○ | x | — |
| Adjustability to formula (III) |  | ○ | ○ | x | x | ○ | — |
| Average particle size of rubber domains (μm) |  | 1.9 | 1.2 | 2.0 | 3.5 | 0.9 | — |
| Average particle size of polyolefin in rubber domains (μm) |  | 0.3 | 0.2 | — | — | — | — |
| Proportion of rubber domains having polyolefin dispersed therein based on the entire rubber domains (% by area) |  | 39 | 40 | — | — | — | — |

The amounts of components in Table are as follows:
Total amount of components (A1B) and (C): 100 wt %
Amounts of component (A2) and additional component (B): amounts by weight based on the total weight of components (A1B) and (C)
POX, DVB, TMP: part by weight based on the total amount of 100 parts by weight of components (A1B) and (C)
*)Granulation infeasible

EXAMPLE 10

The olefin type thermoplastic elastomer obtained in Example 1 was subjected to extrusion by using a 45 mm φ extruder (single flight type screw) manufactured by Watanabe Kakoki K.K., and a sheet having a width of 250 mm and a thickness of 0.35 mm was extruded from a T-die of the extruder, embossing was applied to one surface of the sheet in an average embossing width of 100 μm between an embossing roll (30° C.) and a pressure roll, and a polypropylene resin foam sheet was laminated on the other side under stretching, whereupon the sheet had spreading properties and favorable laminate sheet forming properties.

As evident from the above results, the olefin type thermoplastic elastomer of the present invention is less likely to cause bleeding of a softening agent at a low hardness region, and is excellent in oil resistance, flexibility, mechanical strength, rubber elasticity and extrudability, and further, an extruded product obtained from the elastomer is less likely to have granular structures and has an improved smoothness of the surface, as compared with Comparative Examples.

As explained above, the present invention provides an olefin type thermoplastic elastomer having improved mechanical characteristics such as tensile strength, breaking extension and permanent compression set at a low hardness region of the olefin type thermoplastic elastomer, and further having improved extrudability and surface appearance of an extruded product such as smoothness and reduced granular structures, reduced bleeding of an oil on the surface of the molded product, and an improved oil resistance, and a sheet-form molded product and a laminate employing the olefin type thermoplastic elastomer.

Japanese Patent Application No. 2001-347859 filed on Nov. 13, 2001 including specification, claims, drawings and summary is incorporated herein by reference in its entirety.

What is claimed is:

1. An olefin thermoplastic elastomer comprising domains of a crosslinked olefin copolymer rubber dispersed in an olefin resin, wherein said domains have an average particle size of from 0.1 to 5 μm and the olefin resin is dispersed in an average particle size of from 0.01 to 0.5 μm in at least a part of the domains, and wherein the following formulae (I) to (III) are satisfied:

$$Y \leq -2X+350 \qquad (I)$$

$$X<95 \qquad (II)$$

$$Z \leq 150 \qquad (III)$$

wherein:
X is the JIS A hardness of a molded product measured in accordance with JIS K6253;
Y is the change in the weight in % of a molded product measured based on JIS K6258 using IRM903 oil at 120° C.; and
Z is the number of granular structures on an 250 mm×1, 500 mm extruded sheet surface.

2. The olefin thermoplastic elastomer according to claim 1, wherein the proportion of the domains containing the dispersed olefin resin is at least 10% by area.

3. The olefin thermoplastic elastomer according to claim 1, comprising at least one of a polypropylene, or a propylene-α-olefin copolymer.

4. A sheet-form molded product comprising as a substrate a composition containing the olefin thermoplastic elastomer of claim 1.

5. A laminate having a surface layer comprising as a substrate a composition containing the olefin thermoplastic elastomer of claim 1.

6. The olefin thermoplastic elastomer of claim 1, wherein Y+2X is at most 330.

7. The olefin thermoplastic elastomer of claim 1, wherein Y+2X is at least 60.

8. The olefin thermoplastic elastomer of claim 1, wherein X is at least 10.

9. The olefin thermoplastic elastomer of claim 1, wherein Z is at most 100.

10. The olefin thermoplastic elastomer of claim 1, wherein Z is at most 50.

11. The olefin thermoplastic elastomer according to claim 1, wherein the crosslinked olefin copolymer rubber comprises crosslinked units of at least one selected from the group consisting of an ethylene-propylene copolymer rubber, an ethylene-propylene-unconjugated diene copolymer rubber, an ethylene-butene-unconjugated diene copolymer rubber, and a propylene-butadiene copolymer rubber.

12. The olefin thermoplastic elastomer of claim 1, comprising a paraffin oil.

13. The olefin thermoplastic elastomer of claim 1, comprising at least one selected from the group consisting of a propylene resin, an ethylene resin, and a crystalline polybutene-1 resin.

14. The olefin thermoplastic elastomer of claim 1, comprising a propylene resin.

15. The olefin thermoplastic elastomer of claim 1, wherein
X is 53 to 94
Y is from 87 to 182, and
Z is from 7 to 42.

16. The olefin thermoplastic elastomer of claim 1, comprising at least one first olefin resin selected from the group consisting of polypropylene and a polypropylene-α-olefin copolymer, and at least one second olefin resin selected from the group consisting of an ethylene vinyl acetate copolymer, an ethylene acrylic acid copolymer, an ethylene methacrylic acid copolymer, an ethylene-acrylate copolymer, and an ethylene methacrylate copolymer.

17. The olefin thermoplastic elastomer of claim 1, further comprising a filler selected from the group consisting of a glass fiber, a hollow glass sphere, a carbon fiber, talc, calcium carbonate, mica, potassium titanate fibers, silica, titanium dioxide, and carbon black.

18. A molded product obtained by molding the olefin thermoplastic elastomer of claim 1.

19. A sheet-form molded product comprising as a substrate a composition containing the olefin thermoplastic elastomer of claim 2.

20. A laminate having a surface layer comprising as a substrate a composition containing the olefin thermoplastic elastomer of claim 2.

21. A sheet-form molded product comprising as a substrate a composition containing the olefin thermoplastic elastomer of claim 3.

22. A laminate having a surface layer comprising as a substrate a composition containing the olefin thermoplastic elastomer of claim 3.

23. A sheet-form molded product comprising as a substrate a composition containing the olefin thermoplastic elastomer of claim 6.

24. A laminate having a surface layer comprising as a substrate a composition containing the olefin thermoplastic elastomer of claim 6.

25. A sheet-form molded product comprising as a substrate a composition containing the olefin thermoplastic elastomer of claim 7.

26. A laminate having a surface layer comprising as a substrate a composition containing the olefin thermoplastic elastomer of claim 7.

27. A sheet-form molded product comprising as a substrate a composition containing the olefin thermoplastic elastomer of claim 8.

28. A laminate having a surface layer comprising as a substrate a composition containing the olefin thermoplastic elastomer of claim 8.

29. A sheet-form molded product comprising as a substrate a composition containing the olefin thermoplastic elastomer of claim 10.

30. A laminate having a surface layer comprising as a substrate a composition containing the olefin thermoplastic elastomer of claim 10.

31. A sheet-form molded product comprising as a substrate a composition containing the olefin thermoplastic elastomer of claim 15.

32. A laminate having a surface layer comprising as a substrate a composition containing the olefin thermoplastic elastomer of claim 15.

* * * * *